H. W. Mason,
Harvester Cutter.

No. 106,948.      Patented Aug. 30, 1870.

Witnesses      Henry W. Mason, Inventor his Attorneys.

UNITED STATES PATENT OFFICE.

HENRY W. MASON, OF HAGERSTOWN, MARYLAND.

IMPROVEMENT IN HARVESTER-CUTTER.

Specification forming part of Letters Patent No. 106,948, dated August 30, 1870.

*To all whom it may concern:*

Be it known that I, HENRY W. MASON, of Hagerstown, in the county of Washington and State of Maryland, have invented a new and useful Improvement in Cutter-Bars for Mowers and Reapers; and I do hereby declare the following to be a full, clear, and exact description of the same, reference being had to the accompanying drawing, making a part of this specification, in which—

Figure 1:
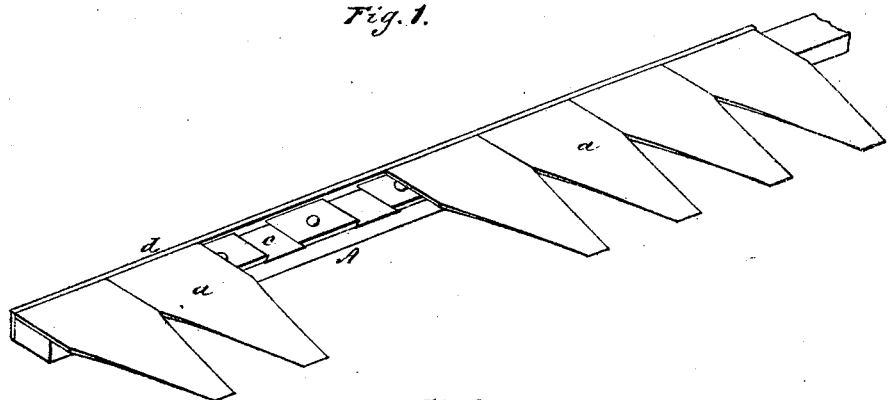
Figure 2:
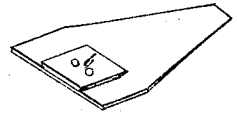

Figure 1 is a view, in perspective, of the bar with two of the teeth removed, showing the dovetail groove; and Fig. 2 is a view of the under side of one of the teeth, showing the tenon which fits into said groove.

This invention has for its object to attach teeth to cutter-bars in mowing and reaping machines in such manner that the teeth may be kept in place in the bar without the use of springs, screws, or any device except a groove and tenon, or the equivalent thereof, and yet may be separately removed from the bar and replaced in the same without difficulty.

In the drawing, A is the cutter-bar, and *a* are the teeth. Each tooth is provided on its under side with a dovetail tenon, *b*. Dovetail grooves *c* are made transversely of the upper side of the bar A, of proper size and in sufficient numbers to accommodate the tenons of all the teeth. The groove may be either cast in the bar or formed by attaching blocks upon the bar at suitable intervals. The tenons should fit tightly in the grooves, so as not to work in any direction, and thus wear out the parts.

A rail, *d*, is attached to the back side of the bar A, which rail projects above the top of the bar far enough to be flush with the upper surface of the teeth *a*. The function of the rail is to prevent the teeth from working backward out of the grooves. The teeth are prevented from moving forward out of the grooves when the bar is in place in the machine by the side of the channel in which the bar plays, which side abuts against the front ends of the tenons *b*, and thus holds the teeth in position; but when the bar A is taken out of the channel the teeth *a* may be slipped out of the grooves *c* with great readiness, and as easily replaced.

When the teeth are in position in the bar there are five different surfaces which make against the lateral movement of each tooth. These are the edges of the two teeth at each side, the sides of the dovetail groove in which the tenon belonging to the tooth is placed, and the rail *d*.

I do not limit myself to the exact construction of the different parts herein shown and described, as others which are equivalent may be adopted instead of them. For instance, the dovetail grooves may be made in the lower instead of the upper side of the bar, and the tenons curve downward so as to enter them. So, also, instead of the rail *d* a flange may be formed across the under side of each tooth, which shall abut against the front side of the bar.

Having thus described my invention, what I claim as new, and desire to secure by Letters Patent, is—

The cutter-bar A, provided with the grooves *c* and rail *d*, in combination with the teeth *a*, provided with the tenons *b*, substantially in the manner and for the purpose specified.

H. W. MASON.

Witnesses:
SOLON C. KEMON,
CHAS. A. PETTIT.